July 5, 1966
R. J. SEYMOUR
3,258,910
FIBER OPTICS IGNITION
Filed June 8, 1962
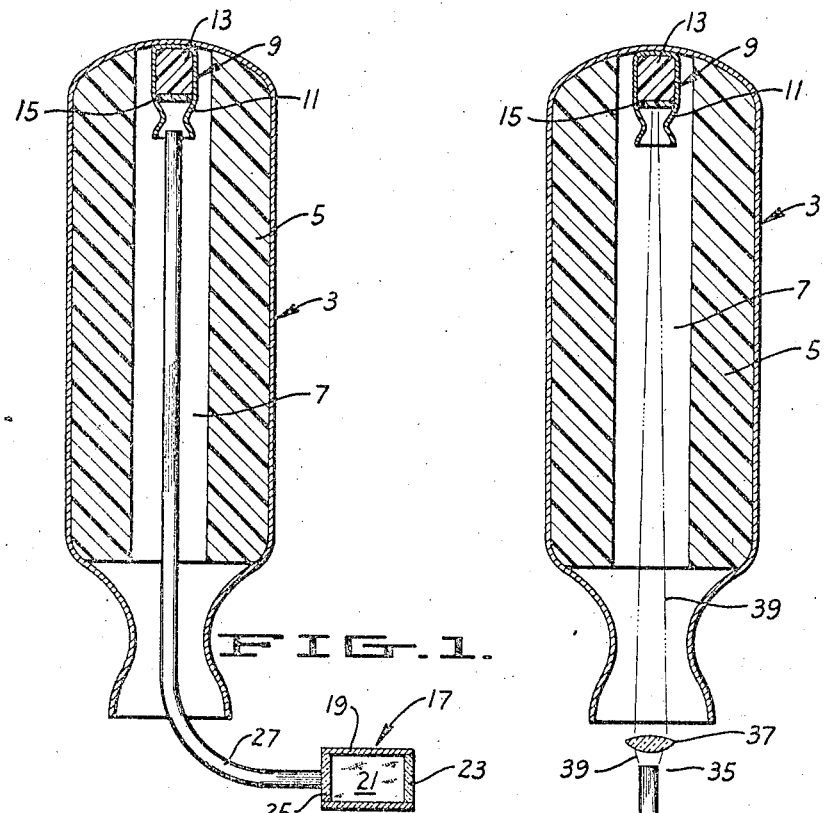
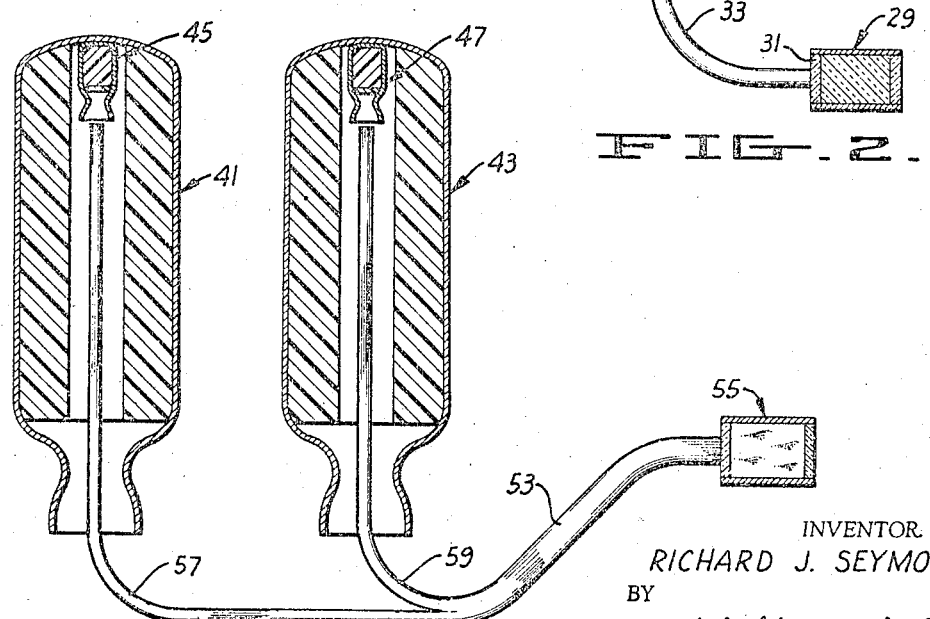
INVENTOR.
RICHARD J. SEYMOUR
BY
Eckhoff & Slick
ATTORNEYS 3,258,910
FIBER OPTICS IGNITION
Richard J. Seymour, Palo Alto, Calif., assignor to United Aircraft Corporation, a corporation of Delaware
Filed June 8, 1962, Ser. No. 201,142
5 Claims. (Cl. 60—35.6)

This invention relates to a novel method of igniting a rocket motor and more particularly relates to a method of igniting a rocket motor using a laser in combination with fiber optics.

It has heretofore been proposed to use the intense beam of coherent light from a laser for the ignition of rocket motors. The optical laser provides many advantages when used for this purpose, since the light is not only coherent but is of high intensity and easy to control. Further, the light from the laser is such that it is easy to determine the exact amount of energy produced so that extremely uniform results are achieved, which is particularly important when tests are being made.

Previously it was proposed to use the direct beam from the laser for the ignition of a rocket motor. Although this method is satisfactory, it does involve certain critical adjustments which are sometimes difficult to achieve, particularly under field conditions. Thus, critical alignment is necessary of the laser, as well as any mirrors or lenses which are used in the system. Further, there is always the possibility that after the initial alignment there will be an accidental misalignment induced by such factors as a technician's error, wind, vibration induced by other motors, enemy action or the like.

In accordance with the present invention, the light energy from a laser is conducted to a rocket motor by means of fiber optics. Fiber optics are well known to those skilled in the art and consist essentially of cables composed of parallel aligned fibers of glass or clear plastic which transmit light by means of internal refraction at the walls of the fiber. Since the individual fibers are quite small, commonly on the order of 50 microns, the cables are flexible and can be bent to follow any desired path so that critical alignment is not necessary. Since the method of transmission is extremely efficient, the cables can be of substantial length, so that the actual laser can be located a substantial distance away from the firing point. One laser can be connected to several cables to ignite more than one rocket, or several lasers may be connected through one or more cables to a single rocket to provide redundancy for positive ignition. Another advantage of using fiber optics in the ignition of rocket motors is that the initiator does not need to be in the line of sight of the nozzle throat, so that motors of any configuration can be ignited as, for example, a motor having a head end igniter and a canted nozzle.

In the drawings forming a part of this application:

FIGURE 1 is a side elevation of a rocket motor provided for laser ignition through a fiber optical cable wherein the cable reaches within the motor.

FIGURE 2 is a system similar to that shown in FIGURE 1 wherein the rays are focused from a point near the nozzle of the motor so that the cable itself does not go within the motor.

FIGURE 3 is a side elevation of a pair of motors showing the ignition system utilizing a common laser.

Turning now to a description of the drawings by reference characters, there is shown in FIGURE 1 a rocket motor 3 having a propellant grain 5 therein, said grain having a central burning port 7. Located within the port 7 is an igniter, generally designated 9, which is in effect a miniature rocket motor. The igniter 9 has a casing 11 having a solid propellant 13 therein, such as a metalized polyurethane incorporating a solid oxidizer. Since such propellant mixtures are relatively difficult to ignite, the surface of the solid propellant 13 may be coated with a pyrotechnic 15 such as ordinary black powder. The laser itself, generally designated 17, may be a gas laser, in which case a suitable container 19 is filled with a gas mixture 21, such as a mixture of helium and neon. The laser has two reflecting end plates, namely, a fully reflecting end 23 and a partially reflecting end 25. The means for pumping and pulsing the laser are well known to those skilled in the art and are not here shown. The beam from the laser is directed to the igniter 9 by means of a fiber optics cable 27 which leads through the nozzle of the rocket motor, through the burning port 7, and terminates adjacent to the pyrotechnic 15. Thus, as the laser 17 is pulsed, the intense beam of light is conveyed by the cable 27 to the powder charge 15, initiating firing. If desired, a shutter, not illustrated, may be provided in the beam and the shutter may be opened mechanically to fire the rocket motor. Alternatively, the pulsing of the laser itself can be used for the firing.

In FIGURE 2, a similar scheme is illustrated, except that here the laser is a ruby laser generally designated 29 having a partially reflecting end plate 31 as previously described. In this embodiment of the invention, a fiber optics cable 33 is employed to convey the light beam part of the way to the igniter 9, but the cable terminates at a point 35 just short of the mouth of the nozzle. The beam of light 39 leaving the cable 33 is focused by means of a lens 37 onto the pyrotechnic mixture 15 of the igniter 9.

In FIGURE 3, a method is shown whereby more than one motor can be fired simultaneously utilizing a single laser. In this embodiment of the invention, motors 41 and 43 are provided as before, with igniters 45 and 47, respectively. A common fiber optics cable 53 from laser 55 branches as at 57 and 59, one of the branches leading to each igniter as shown. In this embodiment of the invention, as the laser 55 is pulsed, light is conveyed simultaneously to both of the motors, insuring simultaneous ignition of both engines. This embodiment of the invention is particularly valuable when a cluster of two or more motors is to be fired and it is important that all of the motors fire at the same instant.

Although not illustrated, more than one laser might be used to feed a single fiber optics cable, or more than one laser, each having its own fiber optics cable, might be used to fire a single engine, the redundancy thus provided ensuring reliable ignition.

It is believed apparent from the foregoing that I have provided a novel system of high reliability for firing one or more rocket motors which obviates many of the difficulties heretofore encountered in the firing of such motors.

I claim:

1. A solid propellant rocket motor having an ignition system comprising in combination:
    (a) a rocket motor having a solid propellant grain and a nozzle;
    (b) an igniter within the rocket motor, said igniter comprising a casing having a solid propellant grain therein;
    (c) a laser;
    (d) a fiber optics cable directing light from the laser to the igniter.

2. The structure of claim 1 wherein the light is directed through the nozzle of the solid propellant motor to the igniter.

3. The structure of claim 1 wherein the fiber optics cable enters the solid propellant rocket motor and terminates adjacent to the igniter.

4. The structure of claim 1 wherein the fiber optics cable terminates adjacent to a lens, which lens focuses light on to the igniter.

5. The structure of claim 1 wherein the igniter has a pyrotechnic coating over a surface of the solid propellant grain therein, said pyrotechnic coating being exposed to light from the fiber optics cable.

References Cited by the Examiner

UNITED STATES PATENTS 2,515,048   7/1950   Lauritsen _____ 102—49
3,068,739   12/1962  Hicks et al. _____ 88—1

OTHER REFERENCES

"Lasers: Devices and Systems—Part III," by Sy Vogel and Leon Dulberger, Electronics, Nov. 10, 1961, pages 81–85.

"The Month in Science," Popular Science, October 1960, pages 25 and 26.

"Principles and Applications of Lasers," Raytheon Corp., May 8, 1962, pages 7 and 14.

"Rockets" Publication, October 1945, page 10.

MARK NEWMAN, *Primary Examiner.*

JULIUS E. WEST, SAMUEL FEINBERG, *Examiners.*

R. J. GOMEZ, G. L. PETERSON, CARLTON R. CROYLE, *Assistant Examiners.*